2,794,708

METHOD FOR THE PRODUCTION OF A SUBSTANTIALLY PURE BORON

Heinz Haag, Goslar, Harz, Germany, assignor to Hermann C. Starck Aktiengesellschaft, Berlin-Lichterfelde, Germany, a corporation of Germany No Drawing. Application March 15, 1954, Serial No. 416,395

1 Claim. (Cl. 23—209)

This invention relates to the production of elementary boron.

The recovery of elementary boron from alkali boron fluorides, for instance, potassium boron fluoride ($KBF_4$) by the use of alkali metals such as sodium is generally known; this recovery is carried out at a temperature which lies above the melting temperature of the potassium boron fluoride; the reaction proceeds in conformity with the following equation $$KBF_4 + 3Na = 3NaF + KF + B$$

(see also U. S. Patent No. 2,465,989 and Podszus, Anorg. Chem. 99 125, 1917).

The thus produced boron is generally protected against the action of air and of furnace gases by the contemporaneously produced molten alkali fluorides to which an alkali halogenide may be added. The exclusion of air and other gases may be obtained by performing the process in a closed metal container. Soluble contaminations may be removed from the reaction components by a treatment with water, hydrochloric and fluorine acid. The purity of the thus produced boron lies between about 50 to 85 percent.

The invention is based upon the recognition that the above described reduction of alkali boron fluoride and particularly potassium boron fluoride with sodium may lead to the very satisfactory yield of a much purer boron if the reduction is carried out in a closed vessel at a greatly reduced pressure.

The total amount of the sodium may be placed in one reduction vessel together with the potassium boron fluoride or it may be entirely or partly placed in an additional vessel.

The reaction is at the beginning carried out at a temperature of 400 to 600° C.; it continues to be strongly exothermically and almost quantitatively.

By the application of known chemical and physical purification methods a boron may be finally obtained having a purity degree of between 90–95 percent. The fine particles of the produced boron are black; with its increase in size the boron assumes a metallic exterior.

The purity degree of the coarse crystalline parts is higher than those of the particles.

The invention will now be described more in detail.

The treating vessel is a horizontal steel cylinder closed at one side which may be provided with a vacuum-tight flange. The cylinder is connected with a vacuum pump.

Upon introduction of a metal vessel containing the stratified mixture of the pure and dry potassium boron fluoride and of the sodium into a cylinder the latter is evacuated to a pressure of $<10^{-1}$ millimeter Hg and heated from the outside, for instance by a heating jacket.

When the charge has reached a temperature of 400 to 600° the reaction commences spontaneously, but it remains controllable. If the pumping is sufficiently increased the pressure increases slightly due to a small release of boron fluoride from the not yet converted potassium boron fluoride, but soon returns to the lowermost possible value.

The reaction product is cooled in vacuo and treated several times with hydrofluoric acid and hydrochloric acid, containing water. Upon rinsing-off the small impure particles adhering to the boron the same is comminuted and treated with concentrated hydrochloric and a 40 percent hydrofluoric acid contemporaneously or successively. The thus preheated product is dried in vacuo and then heated in a high vacuum furnace at a temperature of 1000–2000° C.

At a pressure of $<10^{-4}$ millimeters Hg and at the above mentioned temperature boron hydrogen compounds are decomposed and boron containing impurities as well as lower boron oxides are vaporized. These vaporized light brown products deposited upon the cooler parts of the furnace ignite upon entry of air and burn with a green flame. The thus produced boron is pure; it may be further purified by a treatment with hydrofluoric acid; the purity degree of the thus treated boron is 97 to 99 percent.

Example 1000 grams potassium boron fluoride are mixed with 720 grams sodium and charged in a cylindrical reaction vessel which is closed at one end and connected with a vacuum pump; the mixture is heated at a pressure of $<10^{-1}$ millimeter Hg to an initial temperature of about 500° C. The reaction product is cleaned with hydrochloric acid containing water and 65 grams crude boron having a purity of 90 to 95 percent are thus obtained.

This crude boron is heated in a high vacuum furnace at a pressure of $<10^{-4}$ millimeter Hg absolute and at a temperature of 1000 to 2000° C. until the evaporation of the impurities is completed.

The material is cooled in vacuo to room temperature and immediately upon removal from the furnace treated with hydrofluoride acid for about one half hour at a temperature of about 75–100° C., thereupon it is washed with water and finally dried in a vacuum drier.

Since certain changes in carrying out the above method could be made without departing from the scope thereof, it is intended that all matter contained in the above description shall be interpreted as illustrative and not in a limiting sense.

It is accordingly desired that in construing the breadth of the appended claim it shall not be limited to the specific exemplification of the invention described herein.

Having thus described the invention, what we claim as new and desire to be secured by Letters Patent, is as follows:

A method for the preparation of boron having a purity of between about 97–99% comprising charging potassium boron fluoride and metallic sodium each in a separate open vessel and both of said vessels being enclosed in an outer cylindrical reaction vessel, evacuating said outer reaction vessel and its contents to a pressure of less than 1 millimeter of mercury and simultaneously heating to a temperature of about 400 degrees C. to about 600 degrees C. while maintaining said pressure of less than 1 millimeter of mercury, the potassium boron fluoride reacting with metallic sodium to produce boron in the reaction product, cooling the reaction product under vacuum to room temperature, treating the reaction product with a mixture of concentrated hydrochloric acid and 40% hydrofluoric acid to eliminate boron impurities therefrom, thereafter drying the acid treated product under vacuum, heating the dried product under a pressure of $10^{-4}$ mm. Hg to a temperature of between 1000–2000 degrees C. until all the boron compounds which are volatile and decomposable at this temperature have been removed, and collecting as the residue boron having a purity of about 97–99%.

References Cited in the file of this patent

UNITED STATES PATENTS

| | | |
|---|---|---|
| 953,774 | Appelberg | Apr. 5, 1910 |
| 2,465,989 | Sowa | Apr. 5, 1949 |

OTHER REFERENCES

Mellor: "Comprehensive Treatise on Inorganic and Theoretical Chemistry," 1924, vol. 5, page 9.